United States Patent
Yamakita (10) Patent No.: US 9,434,113 B2
(45) Date of Patent: Sep. 6, 2016

(54) SLIDE FASTENER MANUFACTURING METHOD

(75) Inventor: Yoshimichi Yamakita, Toyama (JP)

(73) Assignee: YKK Corporation (JP)

( * ) Notice: Subject to any disclaimer, the term of this patent is extended or adjusted under 35 U.S.C. 154(b) by 65 days.

(21) Appl. No.: 14/404,295

(22) PCT Filed: May 29, 2012

(86) PCT No.: PCT/JP2012/063808
§ 371 (c)(1),
(2), (4) Date: Nov. 26, 2014

(87) PCT Pub. No.: WO2013/179398
PCT Pub. Date: Dec. 5, 2013

(65) Prior Publication Data
US 2015/0151499 A1    Jun. 4, 2015

(51) Int. Cl.
| | | |
|---|---|---|
| *B21D 53/52* | (2006.01) | |
| *B29D 5/00* | (2006.01) | |
| *A44B 19/42* | (2006.01) | |
| *A44B 19/02* | (2006.01) | |
| *A44B 19/52* | (2006.01) | |
| *B29D 5/02* | (2006.01) | |

(52) U.S. Cl.
CPC ............ *B29D 5/00* (2013.01); *A44B 19/02* (2013.01); *A44B 19/42* (2013.01); *A44B 19/52* (2013.01); *B21D 53/52* (2013.01); *B29D 5/02* (2013.01); *Y10T 24/2539* (2015.01); *Y10T 29/49782* (2015.01); *Y10T 29/49783* (2015.01); *Y10T 29/49785* (2015.01)

(58) Field of Classification Search
CPC ............ Y10T 29/49782; Y10T 29/49783; Y10T 29/49785; A44B 19/52; A44B 19/42; A44B 19/54; A44B 19/02; B29D 5/02
See application file for complete search history.

(56) References Cited

U.S. PATENT DOCUMENTS

| | | | | |
|---|---|---|---|---|
| 2,911,346 A | * | 11/1959 | Cohn ............... | C25D 7/02 204/206 |
| 2,991,528 A | * | 7/1961 | McNamara ........ | A44B 19/42 205/139 |

(Continued)

FOREIGN PATENT DOCUMENTS

| | | |
|---|---|---|
| GB | 2177967 A | 2/1987 |
| JP | H02-036376 B2 | 8/1990 |
| JP | 04-024004 A | 1/1992 |
| JP | 04-367603 A | 12/1992 |
| JP | 08-126503 A | 5/1996 |
| JP | H11-070005 A | 3/1999 |
| JP | EP 1425982 A1 * 6/2004 ............ A44B 19/34 |  |

OTHER PUBLICATIONS

International Preliminary Report on Patentability, PCT Application No. PCT/JP2012/063808, mailed Dec. 2, 2014.
International Search Report, PCT Application No. PCT/JP2012/063808, mailed Aug. 21, 2012.
Written Opinion, PCT Application No. PCT/JP2012/063808, mailed Aug. 21, 2012.

*Primary Examiner* — Jermie Cozart
(74) *Attorney, Agent, or Firm* — Kilpatrick Townsend & Stockton LLP (57) ABSTRACT

There is provided a method for manufacturing a slide fastener. At least one of a pair of right and left fastener tapes and a pair of right and left fastener element rows is colored in a plurality of colors at a predetermined interval in a longitudinal direction by inkjet while the pair of right and left fastener element rows are engaged with each other to provide a fastener chain. The pair of right and left fastener element rows are disengaged. One of the pair of right and left fastener tapes is moved in the longitudinal direction. And then, the right and left fastener element rows are reengaged.

2 Claims, 11 Drawing Sheets

(56) References Cited

U.S. PATENT DOCUMENTS

| | | | | |
|---|---|---|---|---|
| 3,939,547 A * | 2/1976 | Bernier | ............... | B05D 7/14 148/251 |
| 5,020,206 A * | 6/1991 | Yoshida | ............... | A44B 19/42 29/408 |
| 5,056,205 A * | 10/1991 | Kuse | ............... | A44B 19/42 29/408 |
| 5,983,465 A | 11/1999 | Wakai et al. | | |
| 6,279,209 B1 * | 8/2001 | Kang | ............... | B29C 45/14573 24/401 |
| 6,422,851 B2 * | 7/2002 | Kang | ............... | 164/316 |
| 2002/0155187 A1 * | 10/2002 | Kang | ............... | B29C 45/54 425/121 |
| 2003/0110600 A1 * | 6/2003 | Kikukawa | ............... | A44B 19/00 24/399 |
| 2005/0217085 A1 * | 10/2005 | Lu | ............... | A44B 19/02 24/381 |
| 2007/0270308 A1 * | 11/2007 | Yokoyama | ............... | A44B 17/0082 503/201 |
| 2008/0000064 A1 * | 1/2008 | Chou | ............... | B21F 45/18 29/408 |

* cited by examiner

SLIDE FASTENER MANUFACTURING METHOD

This application is a national stage of PCT/JP2012/063808, which is incorporated herein by reference.

TECHNICAL FIELD

The present invention relates to a method for manufacturing a slide fastener and a slide fastener.

BACKGROUND ART

As a conventional slide fastener, there is known a slide fastener in which fastener element rows of a coil shape or a zigzag shape colored in various tints are sewn on tape side edge portions of fastener tapes so that colorful decorative portions are exhibited on a fastener surface by the fastener element rows (e.g., Patent Document 1).

Also, as another conventional slide fastener, there is known a slide fastener in which fastener element rows having one color are injection-molded at a predetermined interval over the entire length of a fastener tape and then fastener element rows having another color are injection-molded over the entire length of the fastener tape to be continued to each fastener element row previously injection-molded and thus to fill up the predetermined interval, so that continuous fastener element rows having different colors are arranged on a tape side edge portion of the fastener tape (e.g., Patent Document 2).

In addition, as further another conventional slide fastener, there is known a slide fastener in which at least one of a warp and a core string of fastener tapes is colored in a plurality of colors at a predetermined interval in a longitudinal direction thereof and also colors of right and left fastener tapes are different from each other (e.g., Patent Document 3).

PRIOR ART DOCUMENT

Patent Document

Patent Document 1: Japanese Patent Application Publication No. H11-070005 A
Patent Document 2: Japanese Patent Publication No. H02-036376 B
Patent Document 3: U.S. Pat. No. 5,983,465

SUMMARY OF INVENTION

Problems to Be Solved by Invention

However, in the slide fastener described in Patent Document 1, a plurality of resins have to be continuously supplied upon extrusion of the fastener element rows, and therefore there is a possibility of increasing manufacturing costs thereof. Also, in the slide fastener described in Patent Document 2, fastener element rows of each color are extruded at a plurality of times, and therefore there is a possibility of increasing manufacturing costs thereof. In addition, in the slide fastener described in Patent Document 3, the warp and the core string colored in a plurality of colors need to be prepared in advance, and therefore there is a possibility of increasing manufacturing costs thereof. Further, when colors of right and left fastener tapes are different from each other, color matching between right and left sides is difficult, and therefore there is a possibility that the manufacturing cost has to be further increased to obtain a desired design.

Also, in the slide fastener described in Patent Documents 1 to 3, manufacturing thereof has to begin from coloring of the fastener element rows, the warp and the core string, and therefore, a long time is taken until completion thereof and thus production efficiency is not good.

Accordingly, the present invention has been made keeping in mind the above described problems, and an object thereof is to provide a method for manufacturing a slide fastener, in which even if at least one of right and left fastener tapes and right and left fastener element rows is colored in a plurality of colors at a predetermined interval in the longitudinal direction in such a manner that a color is different in the right and left sides, an increase in manufacturing cost of the slide fastener can be inhibited and production efficiency thereof can be enhanced, and such a slide fastener.

Means for Solving Problems

The object of the present invention is achieved by the following configurations.

(1) A method for manufacturing a slide fastener, the slide fastener including: a pair of right and left fastener tapes; a pair of right and left fastener element rows respectively provided on opposing tape side edge portions of the pair of right and left fastener tapes, each of the fastener element rows having a plurality of fastener elements; and a slider configured to engage and disengage the pair of right and left fastener element rows; the method including: coloring at least one of the pair of right and left fastener tapes and the pair of right and left fastener element rows in a plurality of colors at a predetermined interval in a longitudinal direction by inkjet while the pair of right and left fastener element rows are engaged with each other to provide a fastener chain; disengaging the pair of right and left fastener element rows; moving one of the pair of right and left fastener tapes in the longitudinal direction; and reengaging the right and left fastener element rows.

(2) A method for manufacturing a slide fastener, the slide fastener including: a pair of right and left fastener tapes; a pair of right and left fastener element rows respectively provided on opposing tape side edge portions of the pair of right and left fastener tapes, each of the fastener element rows having a plurality of fastener elements; and a slider configured to engage and disengage the pair of right and left fastener element rows; the method including: coloring at least one of the pair of right and left fastener tapes and the pair of right and left fastener element rows in a plurality of colors at a predetermined interval in a longitudinal direction by transferring while the pair of right and left fastener element rows are engaged with each other to provide a fastener chain; disengaging the pair of right and left fastener element rows; moving one of the pair of right and left fastener tapes in the longitudinal direction; and reengaging the right and left fastener element rows.

(3) A slide fastener manufactured by the method of manufacturing the slide fastener according to (1) or (2).

Advantageous Effects of Invention

The method for manufacturing the slide fastener according to the present invention includes the steps of: coloring at least one of the pair of right and left fastener tapes and the pair of right and left fastener element rows in a plurality of colors at the predetermined interval in the longitudinal direction by inkjet while the pair of right and left fastener element rows are engaged with each other to provide a fastener chain, disengaging the pair of right and left fastener element rows, moving one of the pair of right and left fastener tapes in the longitudinal direction, and reengaging the right and left fastener element rows. Accordingly, even if at least one of the right and left fastener tapes and the right and left fastener element rows is colored in a plurality of colors at the predetermined interval in the longitudinal direction in such a manner that a color is different in the right and left sides, an increase in manufacturing cost of the slide fastener can be inhibited and production efficiency thereof can be enhanced.

The method for manufacturing the slide fastener according to the present invention includes the steps of: coloring at least one of the pair of right and left fastener tapes and the pair of right and left fastener element rows in a plurality of colors at the predetermined interval in the longitudinal direction by transferring while the pair of right and left fastener element rows are engaged with each other to provide a fastener chain, disengaging the pair of right and left fastener element rows, moving one of the pair of right and left fastener tapes in the longitudinal direction, and reengaging the right and left fastener element rows. Accordingly, even if at least one of the right and left fastener tapes and the right and left fastener element rows is colored in a plurality of colors at the predetermined interval in the longitudinal direction in such a manner that a color is different in the right and left sides, an increase in manufacturing cost of the slide fastener can be inhibited and production efficiency thereof can be enhanced.

EMBODIMENTS OF INVENTION

Hereinafter, embodiments of a method for manufacturing a slide fastener and a slide fastener according to the present invention will be described in detail with reference to the accompanying drawings. In the following description, as for slide fastener, a front side refers to a near side with respect to the paper surface of FIG. 1, a back side refers to a far side with respect to the paper surface of FIG. 1, an upper side refers to an upper side with respect to the paper surface of FIG. 1, a lower side refers to a lower side with respect to the paper surface of FIG. 1, a left side refers to a left side with respect to the paper surface of FIG. 1, and a right side refers to a right side with respect to the paper surface of FIG. 1. In addition, the right and left direction of the slide fastener is also referred to as a width direction. The upward-downward direction of the slide fastener is also referred to as a longitudinal direction.

Figure 1:
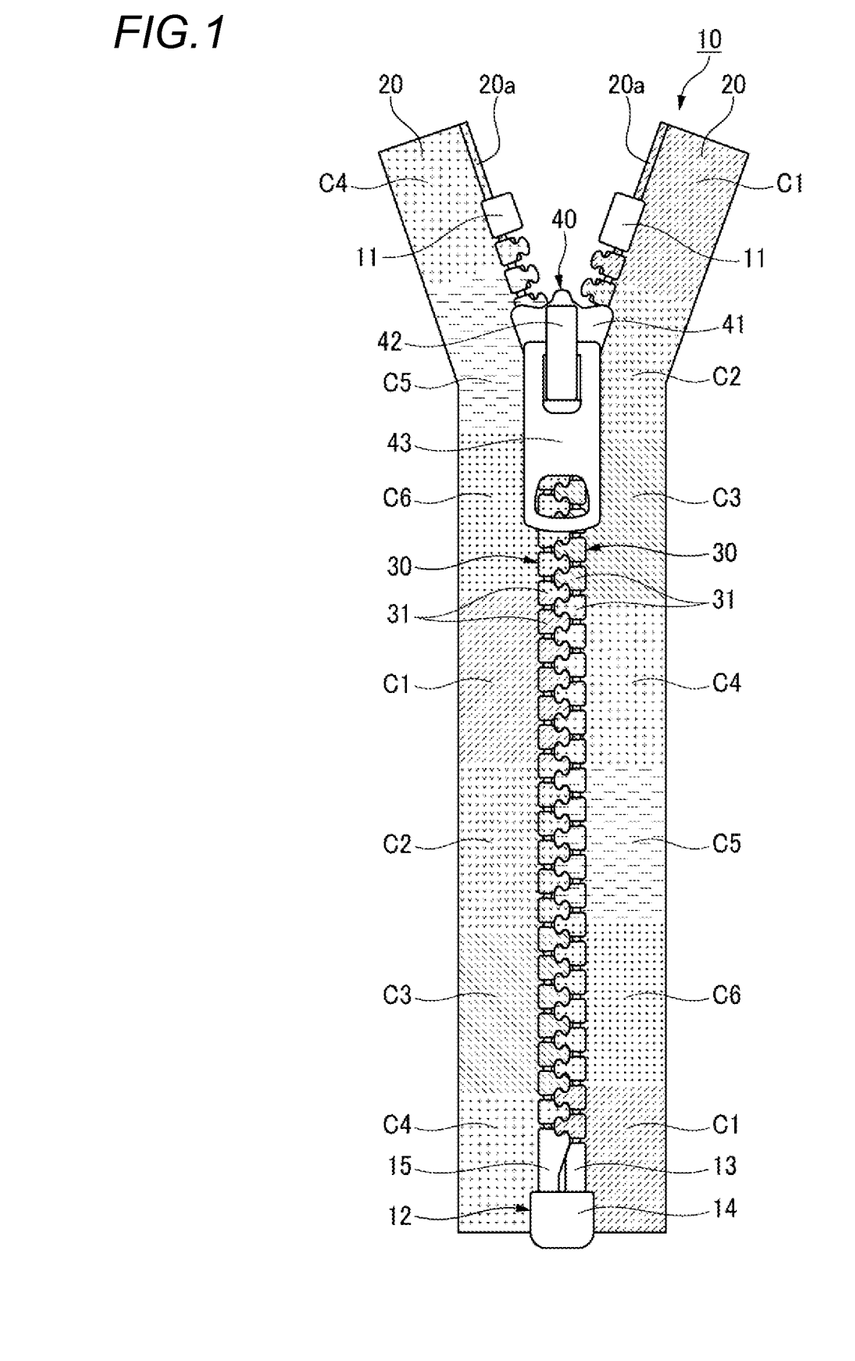
FIG. 1 is a front view illustrating an embodiment of a slide fastener according to the present invention.
Figure 2:
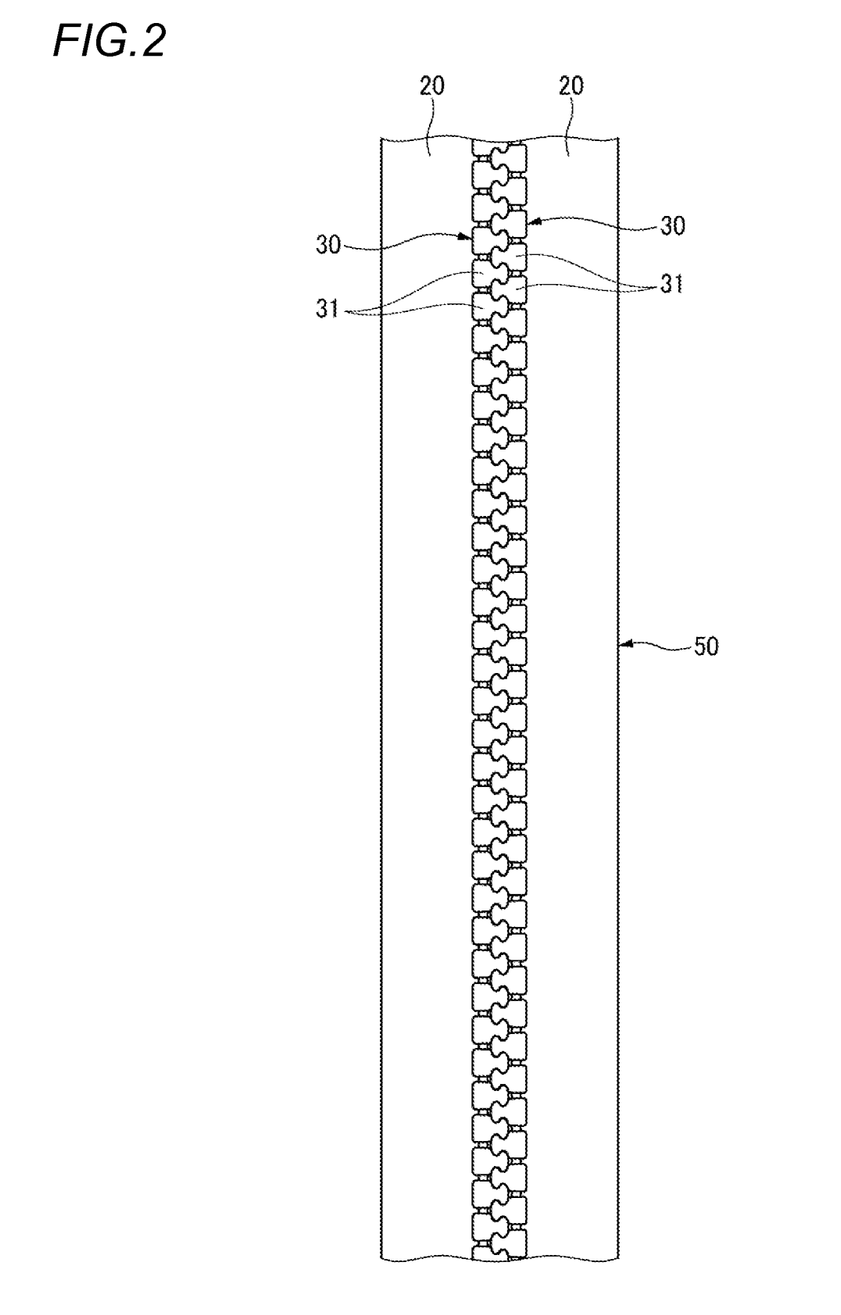
FIG. 2 is a front view illustrating a fastener chain before coloring.
Figure 3:
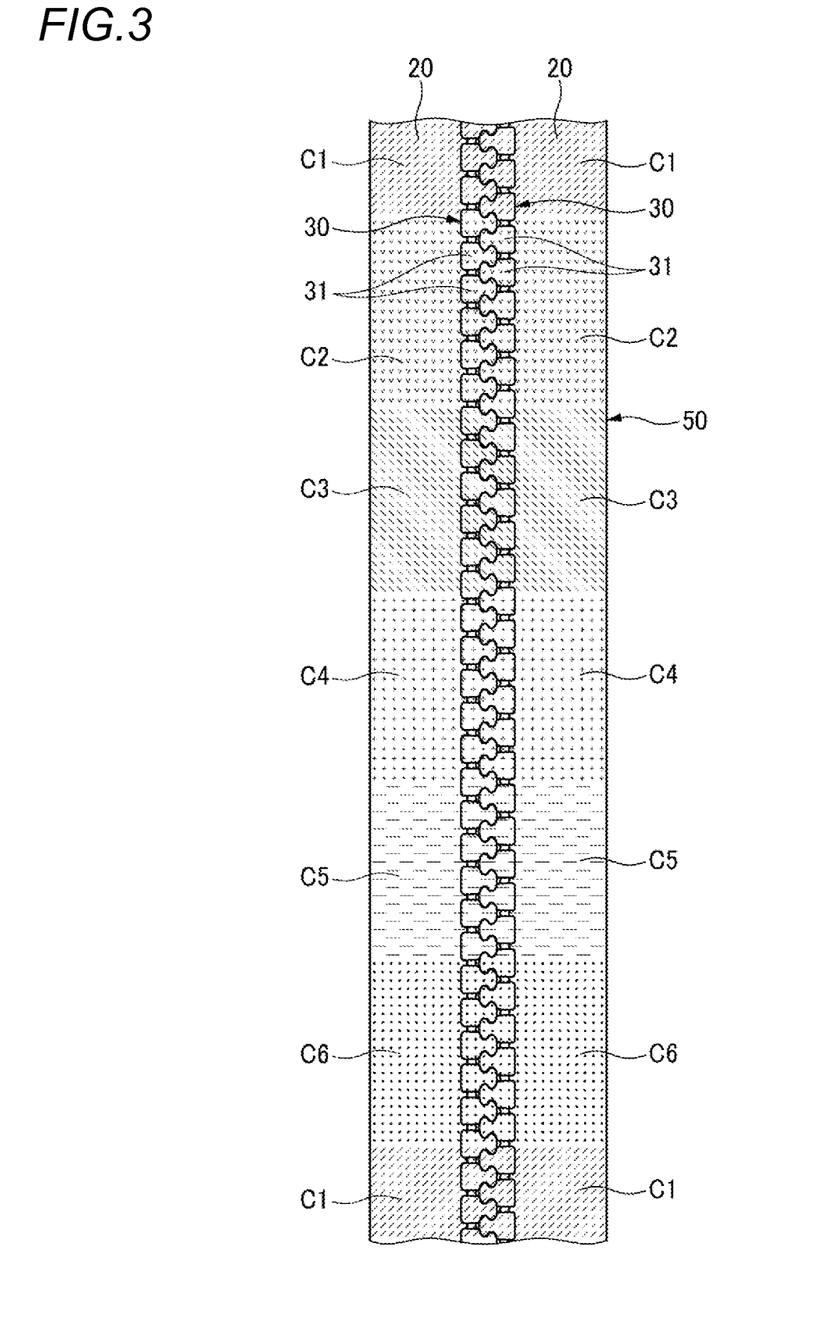
FIG. 3 is a front view illustrating the fastener chain after being colored by inkjet.
Figure 4:
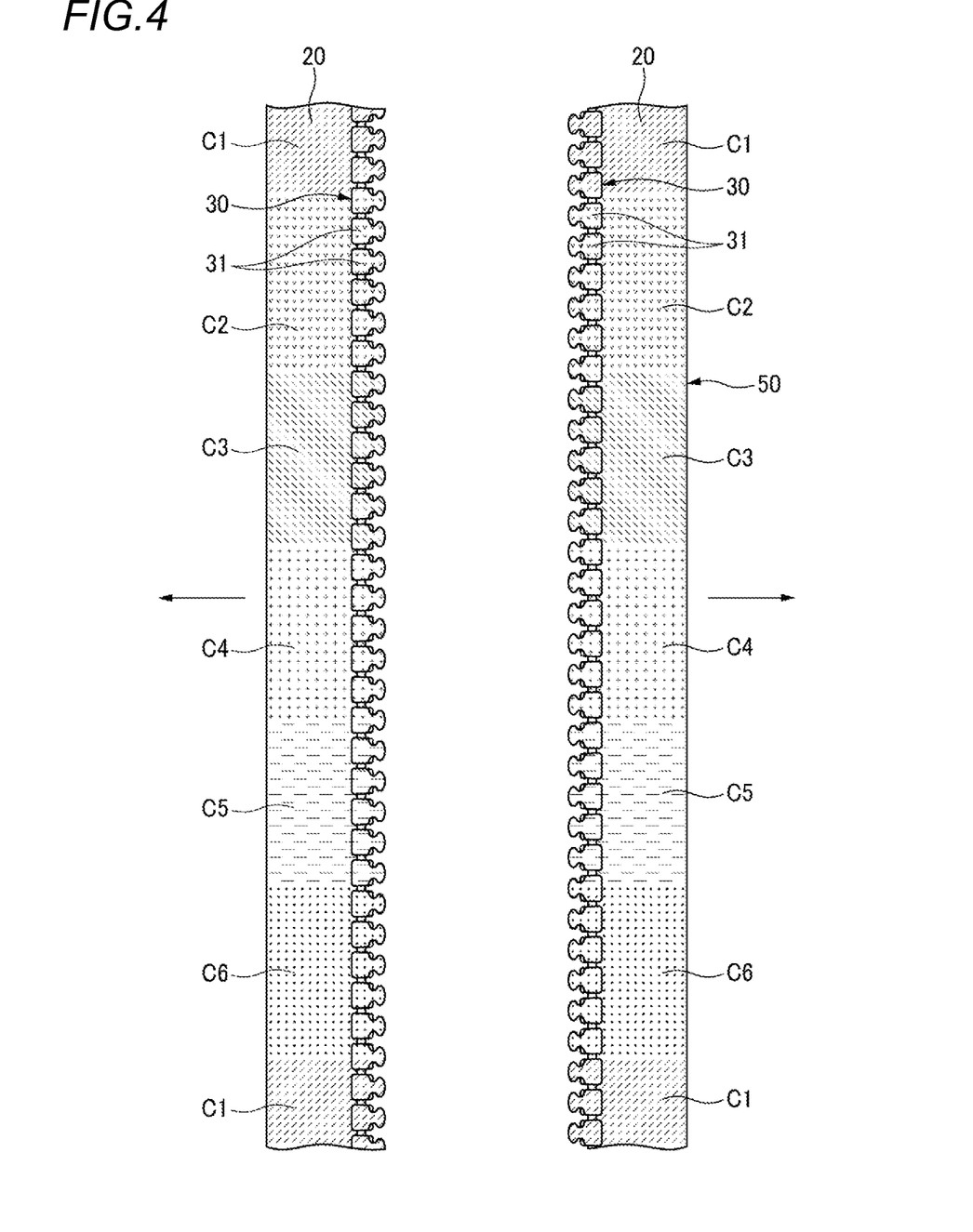
FIG. 4 is a front view illustrating the fastener chain in a state where a pair of right and left fastener element rows are disengaged from each other.
Figure 5:
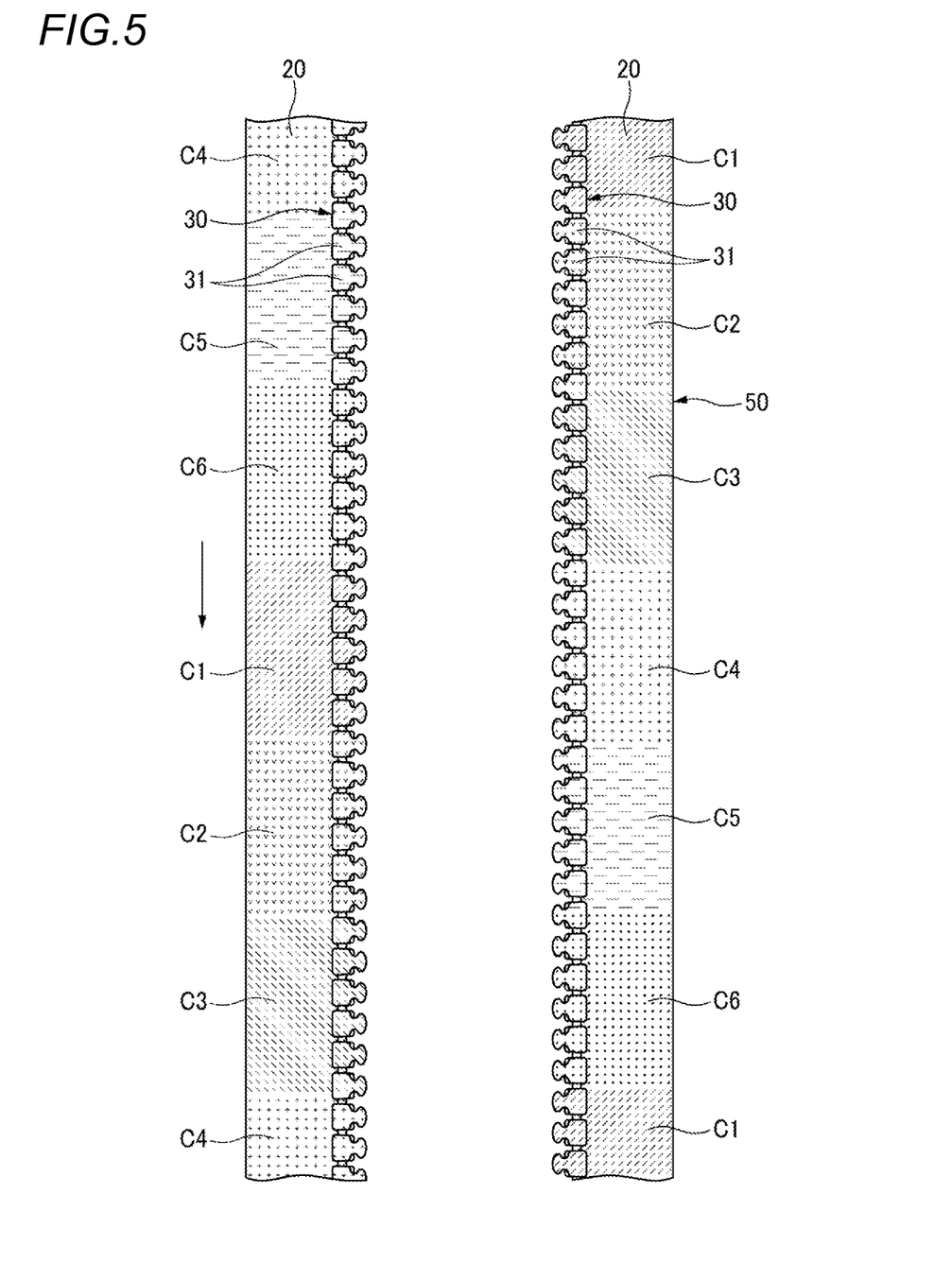
FIG. 5 is a front view illustrating the fastener chain in a state where one side of the pair of right and left fastener element rows is moved in a longitudinal direction thereof.

As shown in FIG. 1, the slide fastener 10 according to the present embodiment includes a pair of right and left woven or knitted fastener tapes 20, each of opposing tape side edge portions 20a of the pair of right and left fastener tapes 20 have an enlarged core portion, a pair of right and left fastener element rows 30 respectively provided on the tape side edge portions 20a, and each having a plurality of fastener elements 31, a slider 40 configured to engage and disengage the pair of right and left fastener element rows 30, top end stops 11 respectively provided on upper end portions of the pair of right and left fastener element rows 30, and openers 12 respectively provided on lower end portions of the pair of right and left fastener element rows 30. As used herein, the term enlarged means that the core portion is raised in a front-back direction of the fastener tapes 20.

Each opener 12 includes a box pin 13 and a box body 14, which are formed on a lower end portion of the tape side edge portion 20a of the right fastener tape 20, and an insert pin 15 formed on a lower end portion of the tape side edge portion 20a of the left fastener tape 20 and adapted to be inserted into the box body 14. Alternatively, the opener 12 may be substituted with bottom end stops.

Each fastener element row 30 is constituted of the plurality of fastener elements 31 and the fastener elements 31 are injection-molded on the enlarged-shaped tape side edge portion 21a of the fastener tape 20, for example using polybutylene terephthalate or polyacetal. Also, polyester is used as a material for the fastener tape 20.

As shown in FIG. 1, the slider 40 includes a body 41, a pull tab attachment section 42 provided on a surface of the body 41, and a pull tab 43 attached to the pull tab attachment section 42. By moving the slider 40 toward the top end stops 11, the pair of right and left fastener element rows 30 are engaged with each other, and by moving the slider 40 toward the opener 12, the pair of right and left fastener element rows 30 are disengaged from each other.

Figure 7:
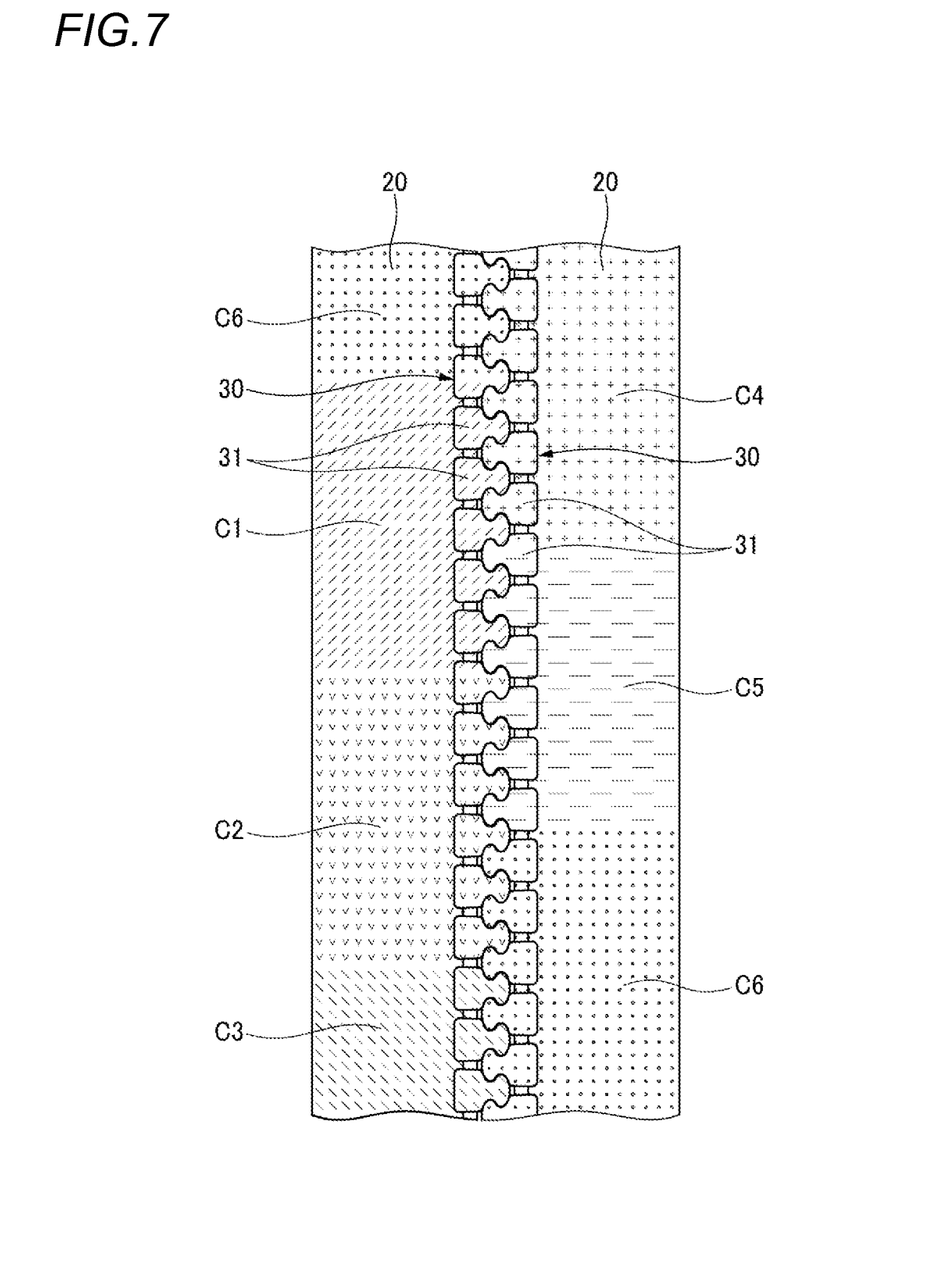
FIG. 7 is an enlarged front view illustrating a case where a location of each boundary between colors does not coincide in the right and left sides.

According to the present embodiment, as shown in FIG. 1, the right and left fastener tapes 20 and the right and left fastener element rows 30 are colored in a plurality of colors (tints) C1 to C6 at a predetermined interval in the longitudinal direction by inkjet, in such a manner that a color (tint) is different in the right and left sides. More specifically, right and left colors C1 to C6 are arranged such that the same color is not overlapped in the width direction. Alternatively, the right and left colors C1 to C6 may be arranged such that the same color is partially overlapped in the width direction. In addition, a location of each boundary between colors C1 to C6 substantially coincides in the right and lefts, but is not limited thereto, and thus may not coincide in the left land light sides (see FIG. 7). Also, the color (tint) is not limited to a single color, but may be a pattern which is represented by a plurality of colors. Further, in the present embodiment, the number of colors is six, but is not limited thereto, and thus the number of colors is optional.

Meanwhile, symbols '/', 'V', '\', '+', '−', '·', shown in the drawings, are not patterns, but represent respectively regions of colors C1 to C6, in which a region represented by the symbol '/' is a region colored in a first color C1, a region represented by the symbol 'V' is a region colored in a second color C2, a region represented by the symbol '\' is a region colored in a third color C3, a region represented by the symbol '+' is a region colored in a fourth color C4, a region represented by the symbol '−' is a region colored in a fifth color C5, and a region represented by the symbol '·' is a region colored in a sixth color C6.

Also, the colors C1 to C6 may include, for example, red, blue, green, yellow, purple, brown, pink, orange, black colors and the like. Meanwhile, the colors C1 to C6 are not limited to such colors. Each boundary between the colors C1 to C6 may be configured so that the colors are gradually changed from one another.

Next, an embodiment of a method for manufacturing a slide fastener according to the present invention will be described with reference to FIGS. 2 to 6.

Figure 6:
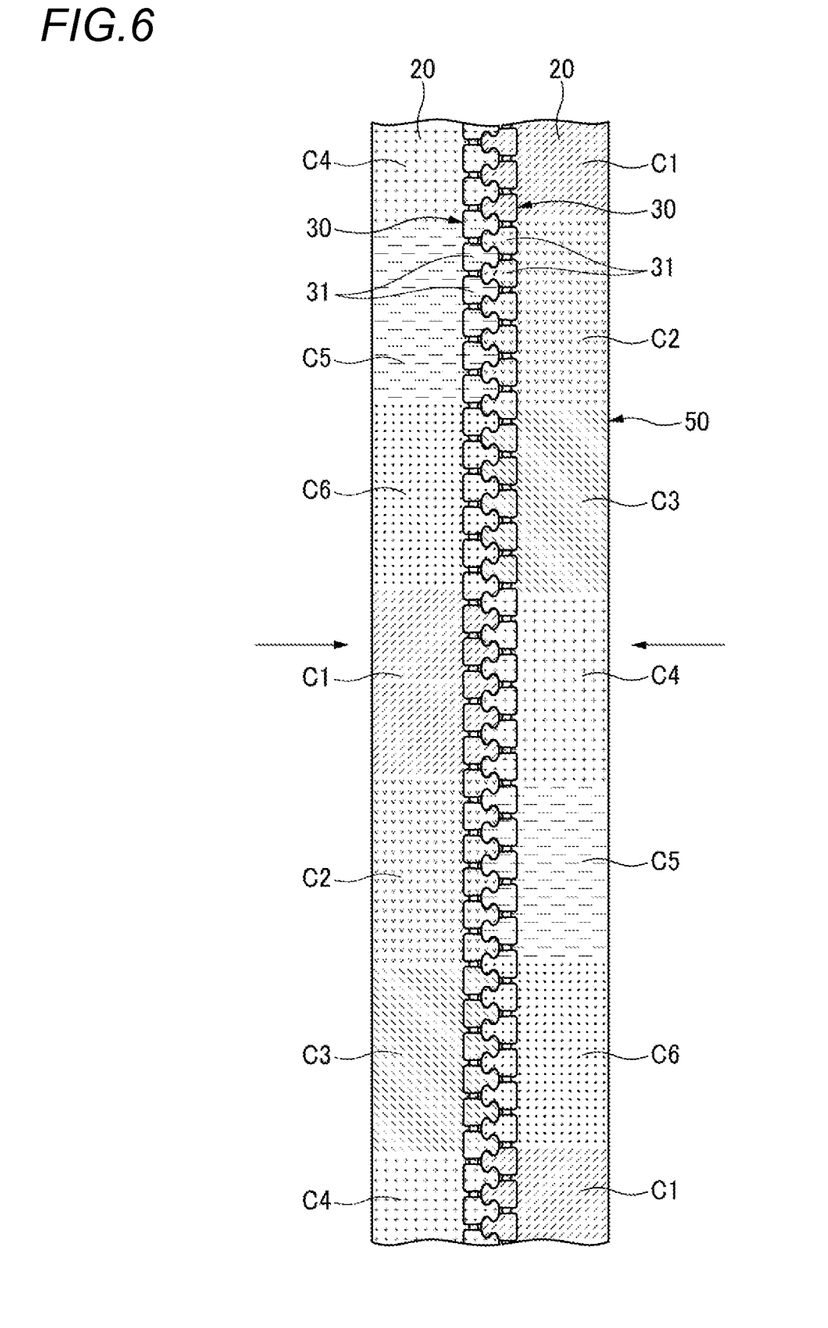
FIG. 6 is a front view illustrating the fastener chain in a state where the pair of right and left fastener element rows are reengaged with each other.

The method for manufacturing the slide fastener 10 according to the present embodiment incudes the steps of: preparing a fastener chain 50 by engaging a pair of right and left fastener element rows 30 with each other (see FIG. 2), coloring a pair of right and left fastener tapes 20 and the pair of right and left fastener element rows 30 of the fastener chain 50 in a plurality of colors C1 to C6 at a predetermined interval in the longitudinal direction by inkjet (see FIG. 3), disengaging the pair of right and left fastener element rows 30 (see FIG. 4), moving the left fastener tape 20 in the longitudinal direction (downward direction in FIG. 5) (see FIG. 5), and reengaging the right and left fastener element rows 30 (see FIG. 6). Meanwhile, the fastener tapes 20 and the fastener element rows 30 of the fastener chain 50 are initially colored in a single color, for example, white color.

Alternatively, in the step of moving the fastener tape 20 in the longitudinal direction, the right fastener tape 20 may be moved, instead of the left fastener tape 20. In addition, in the step of moving the fastener tape 20 in the longitudinal direction, the fastener tape 20 may be moved in an upward direction in FIG. 5, instead of the downward direction in FIG. 5. Further, in the embodiment, the fastener tape 20 is moved by an amount corresponding to three colors, but the movement amount is optional.

Now, a fastener chain coloring apparatus 60 employed in the manufacturing method as described above will be described with reference to FIG. 8.

Figure 8:
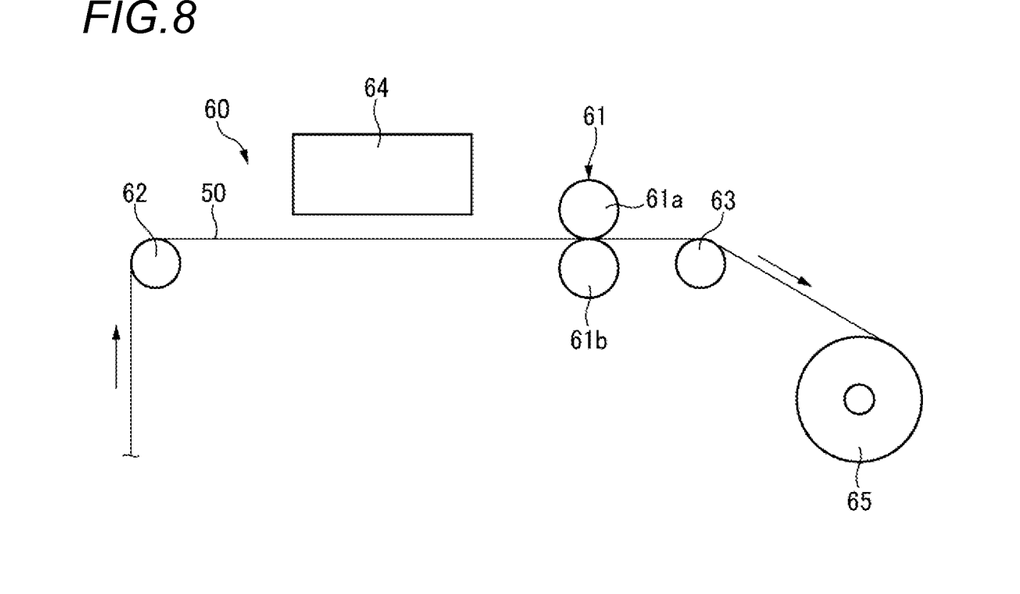
FIG. 8 is a schematic view illustrating an inkjet type fastener chain coloring apparatus.

As shown in FIG. 8, the fastener chain coloring apparatus 60 includes a conveying unit 61 having a driving roller 61a and a driven roller 61b for conveying the fastener chain 50, two guide rollers 62 and 63 for guiding the conveyed fastener chain 50, a coloring unit 64 arranged between the guide roller 62 and the conveying unit 61 for coloring a surface of the conveyed fastener chain 50 in a predetermined color (tint) by inkjet, and a collection roller 65 for winding the colored fastener chain 50 in a drum shape.

As described above, the method for manufacturing the slide fastener 10 according to the present invention includes the steps of: coloring the pair of right and left fastener tapes 20 and the pair of right and left fastener element rows 30 in a plurality of colors C1 to C6 at a predetermined interval in the longitudinal direction by inkjet while the pair of right and left fastener element rows 30 are engaged with each other to provide the fastener chain 50, disengaging the pair of right and left fastener element rows 30, moving one of the pair of right and left fastener tapes 20 in the longitudinal direction, and reengaging the right and left fastener element rows 30. Accordingly, even if the right and left fastener tapes 20 and the right and left fastener element rows 30 are colored in a plurality of colors C1 to C6 at the predetermined interval in the longitudinal direction in such a manner that a color is different in the right and left sides, an increase in manufacturing cost of the slide fastener 10 can be inhibited and production efficiency thereof can be enhanced.

Alternatively, the coloring step of the method for manufacturing the slide fastener may be carried out by transferring, instead of inkjet. Also, in such transferring, a transfer film type fastener chain coloring apparatus 70 shown in FIG. 9 is employed.

Figure 9:
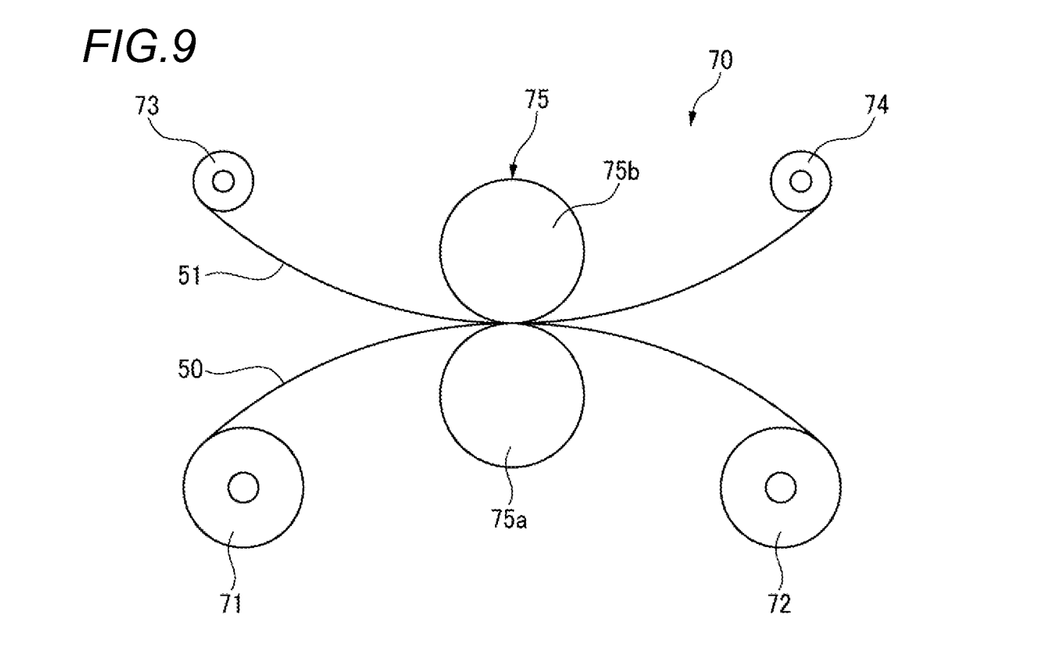
FIG. 9 is a schematic view illustrating a transfer film type fastener chain coloring apparatus.

As shown in FIG. 9, the fastener chain coloring apparatus 70 includes a chain supplying roll 71 for supplying a fastener chain 50, a chain winding roll 72 for collecting the colored fastener chain 50, a film supplying roll 73 for supplying a transfer film 51 onto the fastener chain 50, a film winding roll 74 for collecting the transfer film 51 after transferring, and a conveying unit 75 having a driving roller 75a and a pressing roller 75b for conveying the fastener chain 50 and the transfer film 51. Also, the pressing roller 75b of the conveying unit 75 has a heater equipped therein, and a color (tint) of the transfer film 51 is transferred to the fastener chain 50 by heat from the heater. In addition, the transfer film 51 has different colors (tints) printed thereon at the predetermined interval in a longitudinal direction thereof.

Figure 10:
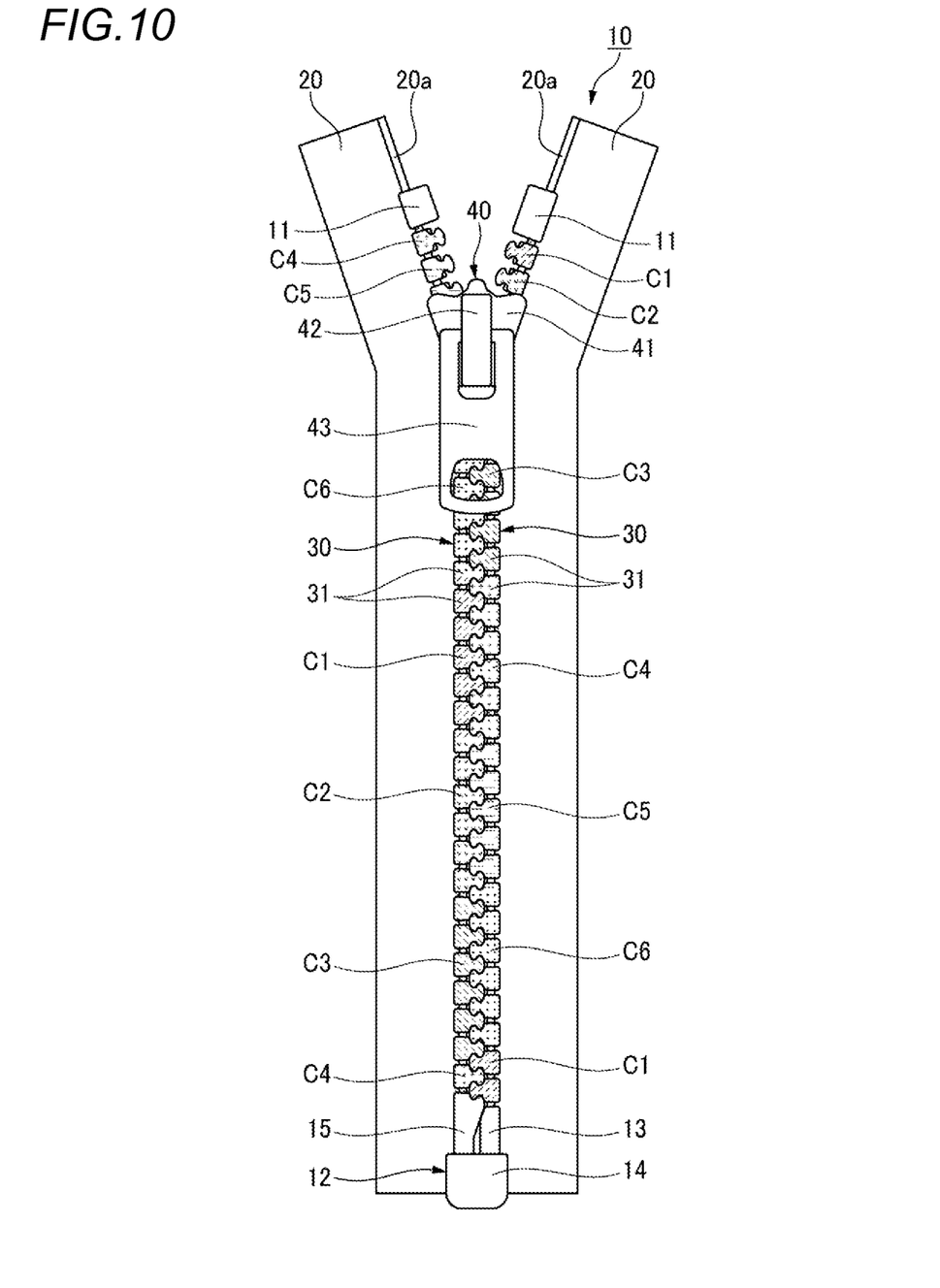
FIG. 10 is a front view illustrating a first variant of the embodiment of the slide fastener according to the invention.

Alternatively, as a first variant of the method for manufacturing the slide fastener according to the present embodiment, during the coloring step, the pair of right and left fastener element rows 30 only may be colored in a plurality of colors C1 to C6 at the predetermined interval in the longitudinal direction by inkjet or transferring. As a result, as shown in FIG. 10, the pair of right and left fastener element rows 30 is colored in a plurality of colors (tints) C1 to C6 at the predetermined interval in the longitudinal direction by inkjet in such a manner that a color is different in the right and left sides.

Figure 11:
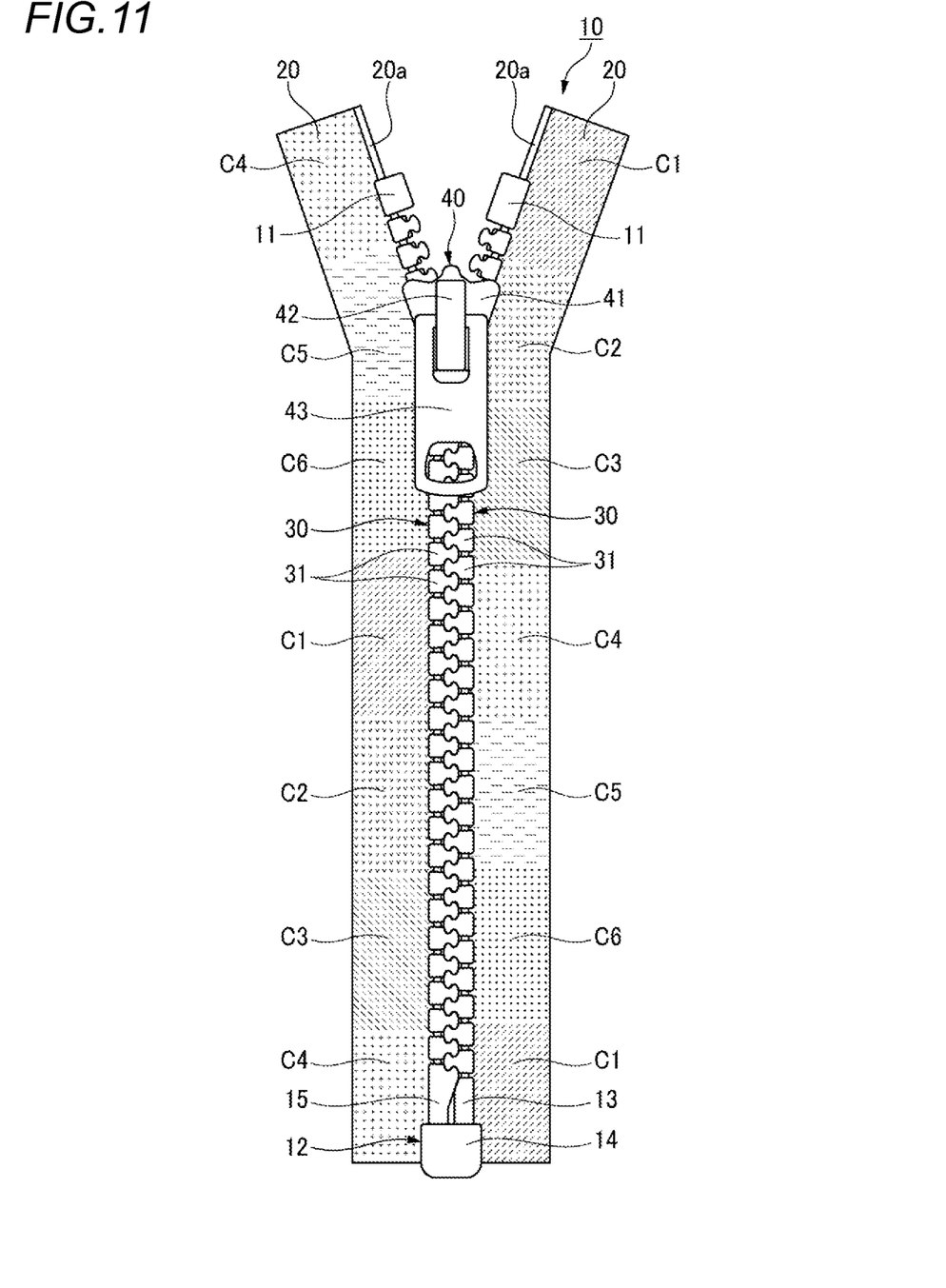
FIG. 11 is a front view illustrating a second variant of the embodiment of the slide fastener according to the invention.

Also, as a second variant of the method for manufacturing the slide fastener according to the present embodiment, during the coloring step, the pair of right and left fastener tapes 20 only may be colored in a plurality of colors C1 to C6 at the predetermined interval in the longitudinal direction by inkjet or transferring. As a result, as shown in FIG. 11, the pair of right and left fastener tapes 20 is colored in a plurality of colors (tints) C1 to C6 at the predetermined interval in the longitudinal direction by inkjet in such a manner that a color is different in the right and left sides.

Figure 12:
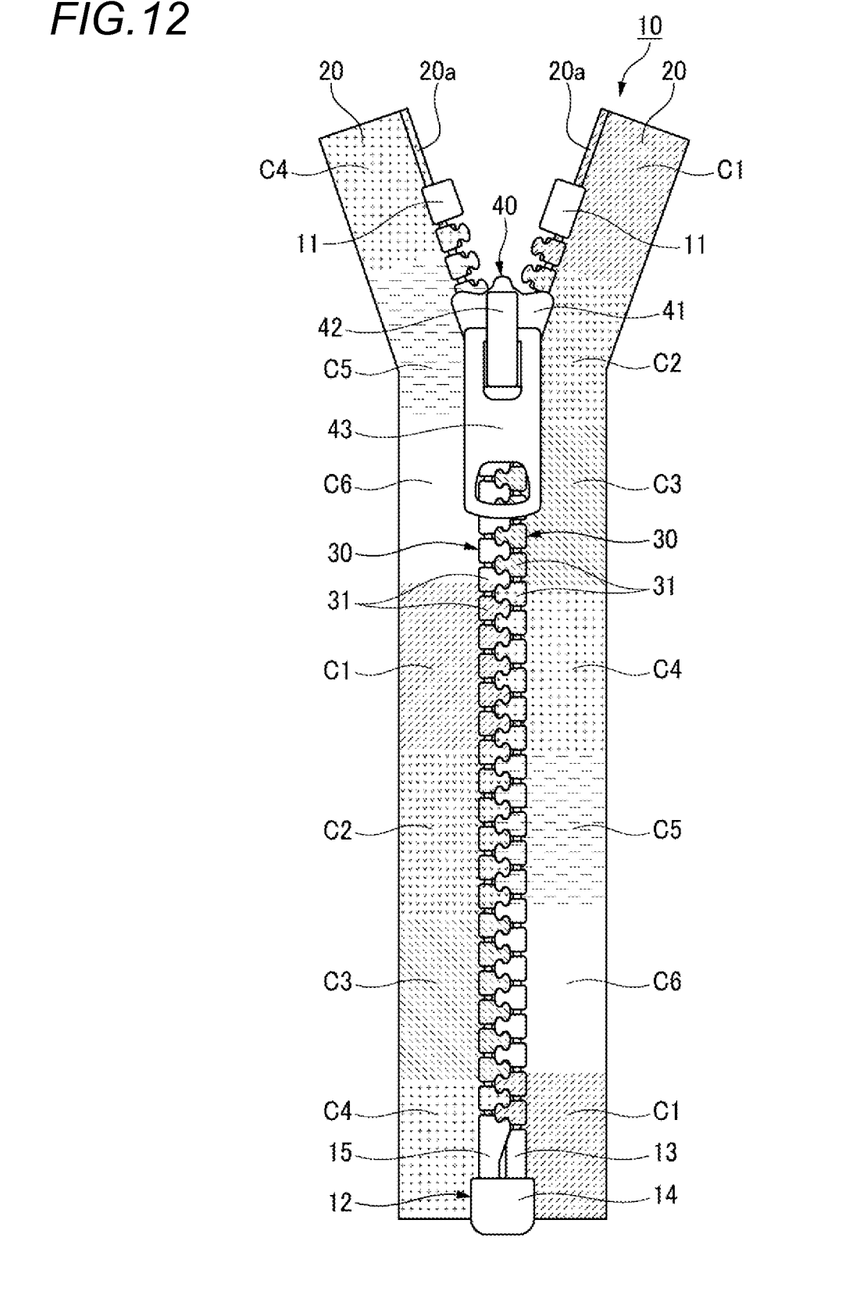
FIG. 12 is a front view illustrating a third variant of the embodiment of the slide fastener according to the invention.

Further, as a third variant of the method for manufacturing the slide fastener according to the present embodiment, during the coloring step, portions (portions corresponding to the color C6) of the pair of right and left fastener tapes 20 and the pair of right and left fastener element rows 30 may not be colored by inkjet or transferring. As a result, as shown in FIG. 12, an original color of the fastener tapes 20 and the fastener element rows 30 appears intact on the uncolored portions.

The present invention is not limited to those that were illustrated in the foregoing embodiments but can be suitably changed without departing from the concept of the present invention.

For example, although in the present embodiment at least one of the fastener tapes and the fastener element rows is colored, the present invention is not limited thereto, and thus the top end stops, the bottom end stops and the opener may be also colored.

DESCRIPTION OF REFERENCE NUMERALS

10 Slide Fastener
20 Fastener Tape
20a Tape Side Edge Portion
30 Fastener Element Row
31 Fastener Element
50 Fastener Chain
C1 to C6 Colors (Tints)

The invention claimed is:

1. A method for manufacturing a slide fastener, the slide fastener comprising:
   a pair of right and left fastener tapes;
   a pair of right and left fastener element rows respectively provided on opposing tape side edge portions of the pair of right and left fastener tapes, each of the fastener element rows having a plurality of fastener elements; and
   a slider configured to engage and disengage the pair of right and left fastener element rows;
   the method comprising:
   coloring at least one of the pair of right and left fastener tapes and the pair of right and left fastener element rows in a plurality of colors at a predetermined interval in a longitudinal direction by inkjet while the pair of right and left fastener element rows are engaged with each other to provide a fastener chain;
   disengaging the pair of right and left fastener element rows;
   moving one of the pair of right and left fastener tapes in the longitudinal direction; and
   reengaging the right and left fastener element rows.

2. A method for manufacturing a slide fastener, the slide fastener comprising:
   a pair of right and left fastener tapes;
   a pair of right and left fastener element rows respectively provided on opposing tape side edge portions of the pair of right and left fastener tapes, each of the fastener element rows having a plurality of fastener elements; and
   a slider configured to engage and disengage the pair of right and left fastener element rows;
   the method comprising:
   coloring at least one of the pair of right and left fastener tapes and the pair of right and left fastener element rows in a plurality of colors at a predetermined interval in a longitudinal direction by transferring while the pair of right and left fastener element rows are engaged with each other to provide a fastener chain;
   disengaging the pair of right and left fastener element rows;
   moving one of the pair of right and left fastener tapes in the longitudinal direction; and
   reengaging the right and left fastener element rows.

* * * * *